(12) United States Patent
Gallart Del Burgo et al.

(10) Patent No.: US 11,604,954 B2
(45) Date of Patent: Mar. 14, 2023

(54) PRINTERS AND CONTROLLERS

(71) Applicant: Hewlett-Packard Development Company, L.P., Spring, TX (US)

(72) Inventors: Adria Gallart Del Burgo, Sant Cugat del Valles (ES); Alex Campa Coloma, Sant Cugat del Valles (ES); Jordi Bas Ferrer, Sant Cugat del Valles (ES); M.Isabel Borrell Bayona, Sant Cugat del Valles (ES); Andreu Gonzalez Oliva, Sant Cugat del Valles (ES); Marti Rius Rossell, Sant Cugat del Valles (ES)

(73) Assignee: HEWLETT-PACKARD DEVELOPMENT COMPANY, L.P., Spring, TX (US)

( * ) Notice: Subject to any disclaimer, the term of this patent is extended or adjusted under 35 U.S.C. 154(b) by 101 days.

(21) Appl. No.: 17/051,420

(22) PCT Filed: Aug. 2, 2018

(86) PCT No.: PCT/US2018/044970
§ 371 (c)(1),
(2) Date: Oct. 28, 2020

(87) PCT Pub. No.: WO2020/027841
PCT Pub. Date: Feb. 6, 2020

(65) Prior Publication Data
US 2021/0224621 A1 Jul. 22, 2021

(51) Int. Cl.
*H04N 1/60* (2006.01)
*G06K 15/10* (2006.01)
(Continued)

(52) U.S. Cl.
CPC .......... *G06K 15/107* (2013.01); *B41F 33/16* (2013.01); *B41L 39/16* (2013.01); *G06K 15/1877* (2013.01); *G06K 2215/0094* (2013.01)

(58) Field of Classification Search
None
See application file for complete search history.

(56) References Cited

U.S. PATENT DOCUMENTS 6,164,756 A    12/2000 Takahashi
6,425,653 B1    7/2002 Bloomberg
(Continued)

OTHER PUBLICATIONS

International Search Report and Written Opinion dated Apr. 11, 2019, PCT Patent Application No. PCT/US2018/044970, filed Aug. 2, 2018, Federal Institute of Industrial Property, Moscow, Russia, 10 pages.

*Primary Examiner* — Dung D Tran

(57) ABSTRACT

Example implementations provide a controller for controlling printing of a printer, the controller comprising:
an input interface for accessing an image to be printed;
an image processor to identify at least one selected feature within the image; and circuitry:
a. to control printing of said at least one selected feature using a respective print operation; and
b. to control printing of said image, other said at least one selected feature, using a further respective print operation;
c. said respective print operation being different to said further respective print operation.

15 Claims, 7 Drawing Sheets

(51) Int. Cl.
*B41F 33/16* (2006.01)
*B41L 39/16* (2006.01)
*G06K 15/02* (2006.01)

(56) References Cited

U.S. PATENT DOCUMENTS

| | | |
|---|---|---|
| 6,533,393 B1 | 3/2003 | Meyer et al. |
| 6,565,192 B1 | 5/2003 | Vinals et al. |
| 8,336,982 B2 | 12/2012 | Vall et al. |
| 9,041,978 B2 | 5/2015 | Cardells et al. |
| 9,844,935 B2 | 12/2017 | Toussaint et al. |
| 2003/0038856 A1 | 2/2003 | Vega |
| 2006/0203028 A1 | 9/2006 | Agarwal |
| 2008/0266343 A1 | 10/2008 | Borrell |
| 2009/0135217 A1* | 5/2009 | Cardells ............... G06K 15/102 347/9 |
| 2017/0043581 A1 | 2/2017 | Mann et al. |
| 2021/0086522 A1* | 3/2021 | Qian .................... G06K 15/107 |

* cited by examiner

PRINTERS AND CONTROLLERS

CLAIM FOR PRIORITY

The present application is a national stage filing under 35 U.S.C 371 of PCT application number PCT/US2018/044970, having an international filing date of Aug. 2, 2018, the disclosure of which is hereby incorporated by reference in its entirety.

BACKGROUND

Within a Computer Aided Design context, and other contexts, the accuracy of printed plots or drawings is desirable. The accuracy of printed plots or drawings is determined by the operation of the printhead in a printer such as, for example, a Thermal Ink Jet (TIJ) printer.

Non-firing intervals can be a concern when using TIJ technology. Evaporation of water contained in a printing fluid such as, for example, an ink, can create a plug in a nozzle orifice of the printhead. The plug can prevent a droplet of ink from being fired or otherwise ejected from the nozzle orifice. The time between firing events is known as the decap time and a defect associated with a blocked nozzle orifice is also known as a decap. Decap anomalies manifest themselves as gaps in printed lines.

BRIEF INTRODUCTION OF THE DRAWINGS

Examples implementations are described below with reference to the accompanying drawings, in which.

DETAILED DESCRIPTION

Figure 1:
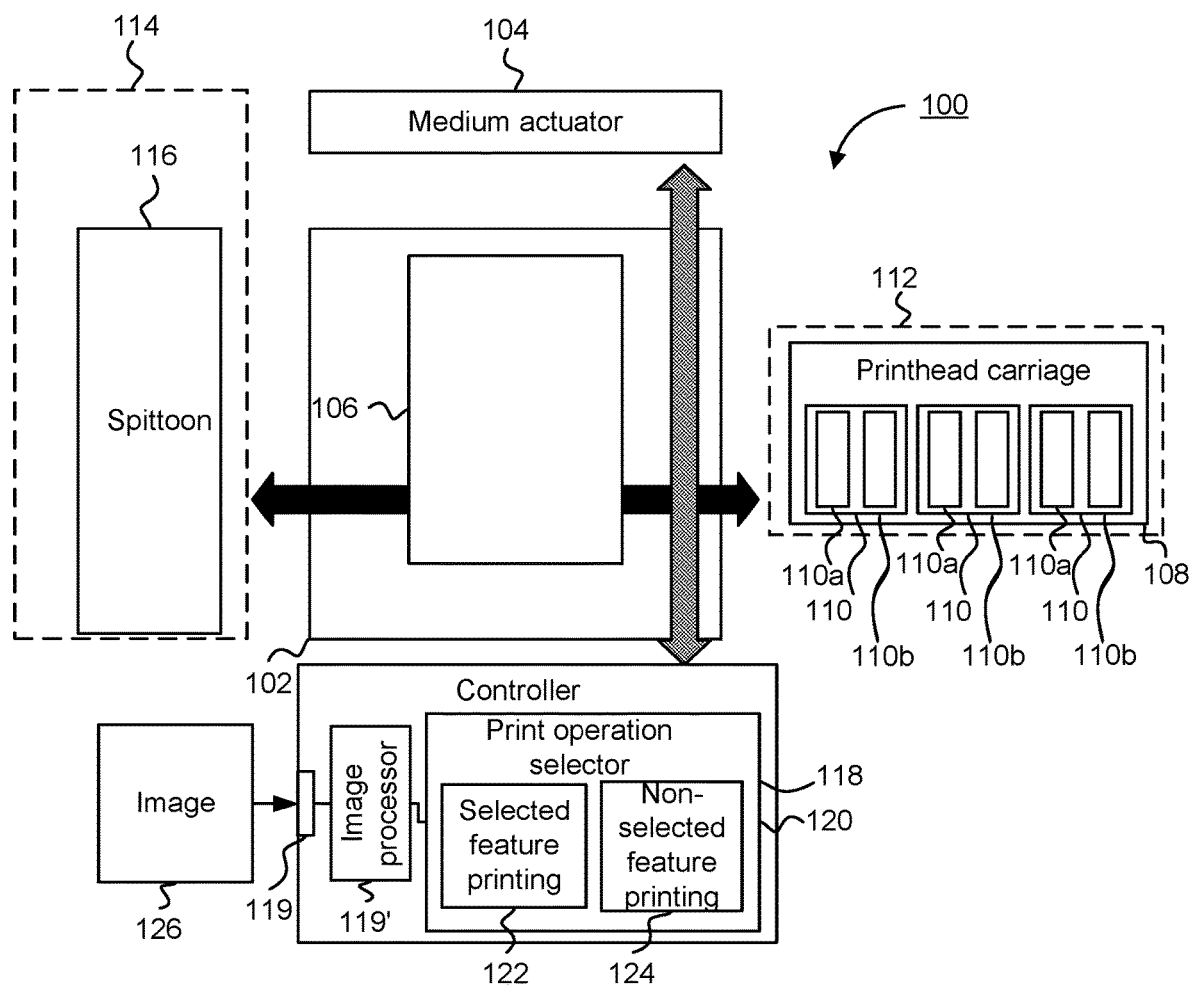
FIG. 1 shows a schematic diagram of a printer according to some examples.

FIG. 1 illustrates a schematic plan view of a printer 100. The printer 100 comprises: a working area 102 in which a printed plot or drawing can be produced. The working area is an example of a printing region. The printer 100 further comprises a medium actuator 104. The medium actuator 104 moves a medium 106 on which a printing fluid is to be deposited in between print traversals of a printhead carriage 108. A print traversal is a movement of the printhead carriage 108 from one side of the working area 102 to the other side of the working area. The printhead carriage 108 comprises one or more than one printhead 110 for printing one or more than one printing fluid. A printhead 110 can comprise one or more than one channel 110a, 110b for receiving and expelling printing fluid. One or more than one printhead 110 can optionally fire, that is, expel or eject, one or more than one printing fluid during a print traversal. Examples can be realised in which the printhead carriage 108 comprises a number of printheads 110. The printheads 110 are arranged to deposit respective printing fluids onto the medium 106. The one or more than one printing fluids can comprise one or more printing fluids associated with a respective colour process. Such a colour process can comprise a single tone or multiple tones. For example, a six-colour process, involving magenta, yellow, cyan, red and two blacks, can be used. Similarly, a nine-colour process could be used. In the example shown, a printhead 110 contains two channels 110a, 110b for printing fluid. The example implementation shown uses a six-colour process with the colours being ejected from respective channels 110a, 110b of the three printheads 110. Examples can be realised in which a nine-colour process can be accommodated via 5 printheads.

The printhead carriage 108, in this example, is arranged to traverse the working area 102 in a reciprocating manner. While traversing the working area 102, the printheads 108 can print printing fluids onto the medium 106. The printheads can deposit printing fluid onto the medium 106 in either one direction, or both directions, of traversal. The printheads 110 can use an array of nozzles (not shown) to deposit the printing fluids. Depositing the printing fluids can use a thermal technique in which a heating element is arranged to heat the printing fluid rapidly so that printing fluid is ejected from a nozzle orifice associated with the heating element.

A stowage area 112 can be provided to one side of the working area 102. The printhead carriage 108 can be stowed in the stowage area 112 between printing traversals.

A maintenance area 114 can be provided to another side of the working area 102. The maintenance area 114 is an example of a maintenance region. The maintenance area 114 can comprise a spittoon 116 for receiving one or more than one printing fluid during one or a number of maintenance operations. Examples can be provided in which the maintenance operations comprise ejecting or expelling printing fluid from one or more than one of the printheads 110. Maintenance operations such as, for example, spitting a printing fluid, purging a printing fluid, printing a printing fluid, flushing a printing fluid, wiping a printing fluid, taken jointly and severally in any and all permutations, are examples of such ejecting or expelling printing fluids.

A controller 118 is provided for controlling one or more aspects of the printer and/or printer operations such as, for example, at least one, or both of, printing operations or maintenance operations. The controller 118 comprises an input interface 119 for receiving an image 126 to be printed. The image 126 is processed by an image processor 119' to identify any selected features within the image 126. The controller 118 can control the printing operations according to a selected printing operation. A current printing operation can be determined or set by a print operation selector 120. The print operation selector 120 is arranged to print at least one selected feature, or any selected feature identified by the image processor 119', in a predetermined manner using at least one selected feature print operation 122. The print operation selector 120 represents an example of print control circuitry. At least one print operation can comprise one or more print operations. Therefore, at least one selected feature print operation can comprise one or more than one print operation relating to a selected feature. The at least one selected feature can comprise at least one, or both, of at least one line or at least one edge, which is, or are, printed in the predetermined manner. An edge is the outermost line of pixels of an area or area-fill. The area or area-fill can be an area or area-fill of the same colour of any colour of a colour process used in the printer such as, for example, a black. The predetermined manner comprises printing the at least one selected feature on a predetermined traversal or on predetermined traversals of the printheads 110 over the medium.

Also shown in FIG. 1 is an optional further print operation 124, or non-selected feature printing operation, that is used to print features of an image 126 other than selected features. The further print operation 124 can be used to print anything other than the at least one selected feature. Therefore, example implementations can be realised in which the further print operation 124 is used to print features other than at least one, or both, of lines or edges.

Within the selected feature print operation 122, the traversal or the predetermined traversals can have a given relationship to the number of traversals for other printing by the printer in the further print operation 124. The traversal or the predetermined number of traversals, within the selected feature print operation 122, can be a proportion or a fraction of the traversals used in printing according to another print operation other than the selected feature print operation 122 for printing the at least one selected feature such as, for example, the further print operation 124.

For example, implementations can be realised in which printing a predetermined colour of a multi-colour process can be arranged to use the traversal or the predetermined traversals. In contrast, printing a different colour of the multi-colour process can use different traversals other than said traversals or the predetermined traversals. Example implementations can be realised in which printing the predetermined colour uses fewer print operations per set of traversals as compared to printing the different colour, which uses more print operations per set of traversals. A set of traversals can be referred to as a multipass printmode in which printing is, or can be, effected via multiple passes of printheads over the medium.

Implementations can be realised in which the number print operations per traversal associated with printing the at least one selected feature within the selected print operation 122 is half of the number of print operations per traversal for printing features other than the at least one selected feature. Although the above refers to half the number of printing operations, example implementations are not limited to such an arrangement. Example implementations can be realised in which some other fraction or ratio is used.

In selecting or setting a current print operation or current print operations, the print operation selector 120 can be responsive to processing the image 126 to be printed. The image 126 can be processed to detect one or more than one characteristic of the image 126 suitable for using in the selected feature print operation 122. It can be appreciated that the selected feature print operation can comprise a reduced number of print operations per traversal or set of traversals relative to the further print operation 124. The one or more than one characteristic of the image can one or more than one instance of the at least one selected feature. For example, the image may comprise one, or both, of a line or an edge.

Therefore, it will be appreciated that printing an edge or a line can use a reduced number of print operations per traversal relative to printing features of the image 126 other than the edge or the line. Example implementations can be realised in which printing an edge or a line in, for example, black or any other colour, can also use a reduced number of print operations per traversal relative to printing features of the image other than the edge or the line.

Although the examples have been, or are, described with reference to separate stowage 112 and maintenance 114 areas, examples can alternatively be realised in which the stowage 112 and maintenance 114 areas are the same, which means a single such area can be provided as opposed to two such areas.

Although example implementations can be realised in which the at least one selected feature can comprise at least one, or both, of a line or an edge, further implementations can alternatively, or additionally, be realised in which the at least one selected feature is a colour of a colour process. For example, the colour of the colour process can be a black. Therefore, any and all implementations can be realised in which the at least one selected feature comprises a line, an edge or a predetermined colour taken jointly and severally in any and all permutations.

Figure 2:
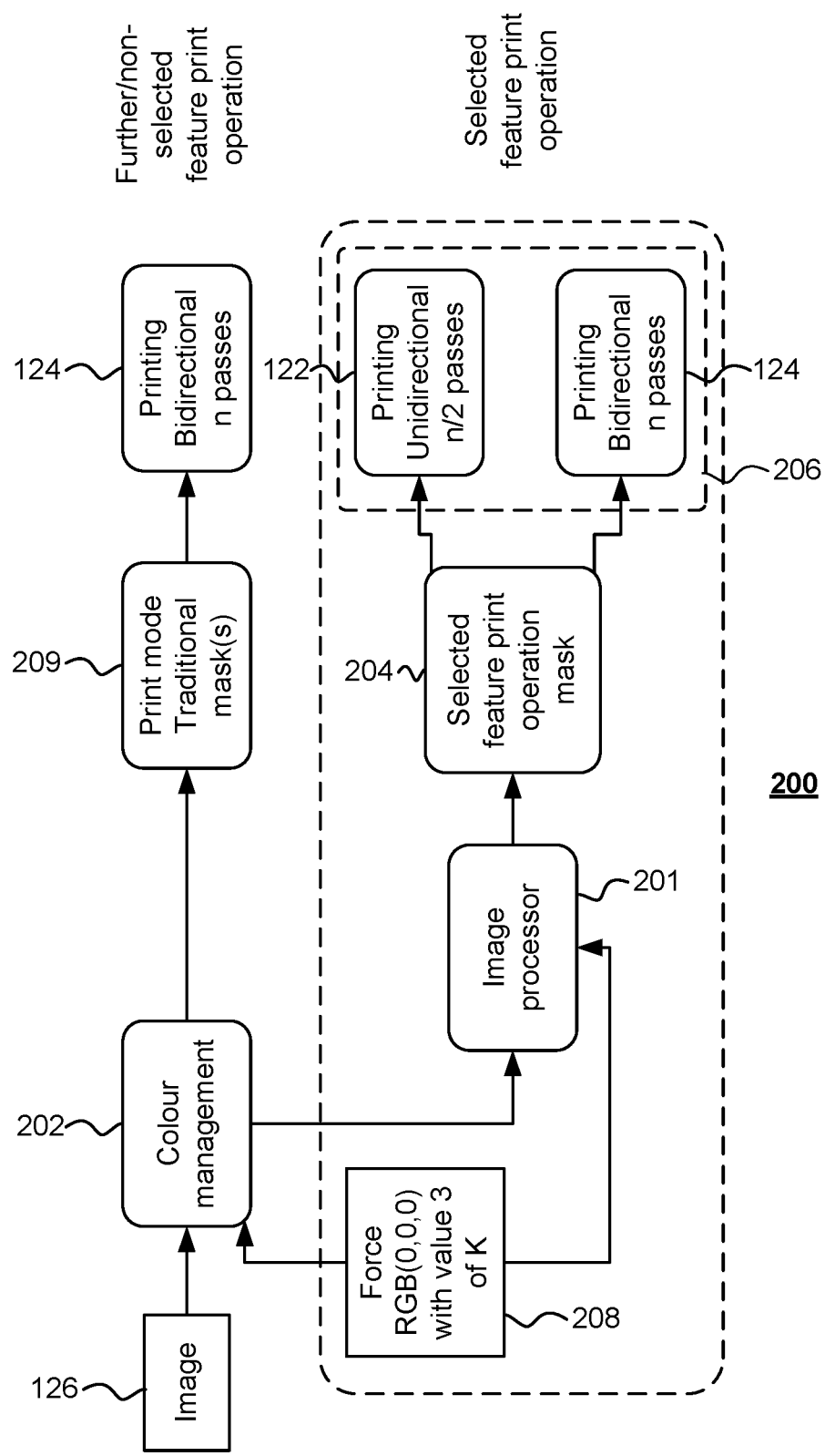
FIG. 2 illustrates a printing process according to some examples.

FIG. 2 is a view 200 depicting the selected feature print operation 122 and the further print operation 124. FIG. 2 also shows the image 126 to be printed. The image 126 to be printed can be analysed by an image processor 201. The image processor 201 is an example of the above described image processor 119'. The image processor 201 is arranged to determine if the image 126 to be printed contains one or more than one instance of the selected feature. A colour management process 202 can be provided to map the colour space of pixels of the image 126 to appropriate combinations of colours of the colour space of the printer. Realising a mapping between the colour space of the image 126 and the colour space of the printer can use a look-up table.

In the example shown, a data structure associated with data units of the image 126 to be printed that relate to, or are representative of, any instance of a selected feature is constructed. The data units can comprise pixels. The data structure can comprise one or more than one print mask. A print mask influences how the image 126 is printed. Example implementations can be realised in which a print mask influences how parts of the image 126 associated with any instance of a selected feature is printed. Therefore, an example implementation can provide a selected feature print operation mask 204 for influencing how any instance of a selected feature of the image 126 is printed. In the example shown, the selected feature print operation mask 204 is arranged to cause data units of the image 126 associated with a selected feature to be printed in a predetermined manner. As indicated above, examples can be realised in which the predetermined manner comprises a predetermined number of print operations per set of traversals for the data units of the image 126. Example implementations use a fraction or proportion of the number of print operations per set of traversals for any data units associated with the selected features as compared to data units other than those associated with any selected features. A particular example implementation can use half of the number of print operations per set of traversals for data units associated with any selected features as compared to the number of print operations per traversal for data units not associated with any selected features.

Therefore, example implementations described herein can use a predetermined number, n, of print operations per set of traversals of the printhead carriage 108 to print feature of the image 126. The feature can be a colour of one or more than one pixel, or other data unit, of the image 126 corresponding to features other than selected features. Example implementations can use a different number, m, of print operations per set of traversals of the printhead carriage 108 to print a feature such as, for example, a colour of one or more than one pixel, or other data unit, of the image 126 corresponding to a selected feature or selected features. Examples can be realised in which m=n/2. Therefore, examples can be realised in which n=8 and m=4. A set of traversals can comprise n traversals of the printhead carriage 108 over the medium. Therefore, when printing a selected feature, printing of a colour associated with the selected feature, such as, for example, a black, does not occur on every traversal.

Therefore, a combined print mode 206 can be realised that is a combination of the selected feature print operation 122 and the further print operation 124. The combined print mode 206 is arranged to print any selected features of the image 126 using the selected feature print operation 122 and to print any other features of the image 126 using the further print operation 124. Consequently, an area-fill, that is, an area of the image that is the same colour, will use the selected feature print operation 122 for any edges of the area and the further print operation 124 for parts of the area-fill bounded by those edges.

Example implementations can be realised in which the selected feature comprises any data units of the image 126 having predetermined values within a colour space associated with the image 126. In the example shown, the colour space associated with the image 126 can be a Red-Green-Blue (RGB) colour space. The predetermined values can comprise any black RGB values such as, for example, RGB(0,0,0). Therefore, any pixels of the image 126 having the predetermined values are potential selected features to be printed using the selected feature print operation 122. The present example will use RGB(0,0,0) as the predetermined values even though examples are not limited thereto. Other predetermined values could alternatively, or additionally, be used. Any instances of RGB(0,0,0) values that form at least one, or both, of a line or an edge are identified by the image processor 201 to create the associated print masks.

In the example shown, instances of the predetermined values such as, for example, RGB(0,0,0) values, are coded using a predetermined code. The predetermined code can be associated with a predetermined print mask. In the example shown, the predetermined code is 3, which identifies a pixel, or other data unit, of the image that has the predetermined RGB values.

A selected feature colour process 208 can be used to provide an indication to the image processor 201 of a colour of interest, or colour of potential selected features, taken from the colour space, that is, an indication of the predetermined values of interest.

A mask can comprise a plurality of values. The plurality of values can be associated with the data units of the image 126 to be printed. A mask can be realised in which each value is associated with a respective data unit, such as, for example, a pixel, of the image 126 to be printed. The values can determine the print mask with which the associated data unit of the image 126 is to be printed. The values can be one or more values of a plurality of values. The plurality of values identifies respective print masks. Example implementations can be realised in which the plurality of values is taken from a set of values. A value of 0 can be associated with a print traversal that does not deposit a printing fluid.

Example implementations can be realised in which the selected feature print operation mask comprises a subset of a number of print operations as compared to the number of print operations associated with the further print operation mask 208. Example implementations can be realised in which the subset of values comprises either even values or odd values. Example implementations can be realised in which the subset of values comprises only even values. It will be appreciated that such a subset of even values prints data units of the image 126 associated with any selected features on even numbered print traversals of the predetermined number, n, of total possible print traversals.

Figure 3:
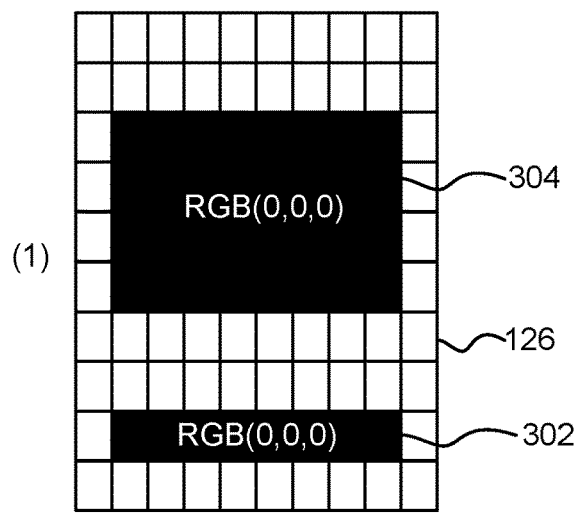
FIG. 3 depicts mask assignment according to some examples.

Referring to FIG. 3, there is shown a view 300 of the coding performed by the colour management process 202 in response to the selected feature colour process 208. As can be seen from sub-figure (1), the image 126 to be printed, in the example depicted, comprises a line of vertical pixels 302 and an area, or area-fill, of pixels 304. The selected feature colour process 208 can indicate to the image processor 201 that the selected feature is a line or edge having a predetermined colour, such as, for example the predetermined values RGB(0,0,0) indicated. Therefore, pixels of the image 126 corresponding, firstly, to the colour criterion RGB(0,0,0) and, secondly, to forming at least one, or both, of being part of a line or an edge are encoded accordingly.

Therefore, it can be appreciated from sub-figure (2) that the line 302 and the edge 306 of the area 304 have been coded with a value indicating that they should be printed using the selected feature print mode 122. The other pixels of the area 304, other than those corresponding to a suitably coloured line or edge, have been, additionally or alternatively, coded to be printed using a print operation other than the selected feature print mode such as, for example, the further print operation 124.

In the example depicted, the pixels identified as corresponding to selected features to be printed using the selected feature print operation have been coded using a predetermined value. In the example shown, the predetermined value corresponds to a print mask to be used in printing those pixels. In the example shown, the predetermined value is "3", which corresponds to using a print mask associated with the selected feature print operation 122. Furthermore, features other than the lines or edges of the appropriate colour, such as, for example, RGB(0,0,0), are encoded with a respective predetermined value. In the example shown, the respective predetermined value corresponds to a print mask to be used in printing corresponding pixels. In the example shown, the respective predetermined value is "2", which corresponds, for example, to a print mask associated with the further print operation 124.

Therefore, it can be appreciated that example implementations can be realised in which a common area such as, for example, the area 304, is printed using multiple print mask that have different numbers of print operations per set of traversals even though such a common area has a common colour. Therefore, the common colour or predetermined values are printed using different print operations. The different print operations can be determined or dictated by respective print masks. Accordingly, the edge 306 can be printed using a given respective print mask and the inner pixels 308 can be printed using a respective print mask that is different to the given respective print mask. Example implementations can be realised in which the given respective print mask is the selected feature print operation mask 204. Additionally, or alternatively, the respective print mask that is different to the given respective print mask is the further print operation mask 209.

Examples can be realised that provide an intermediate stage of processing by the image processor 201 in which all pixels having the predetermined colour are assigned for printing by the same or by a common print operation such as, for example, the selected feature print operation 122. The image processor 201 can be arranged to identify pixels assigned to the selected feature print operation mask 204 that are adjacent to, or otherwise surrounded by, other pixels assigned to the selected feature print operation mask 204 to reallocate any such identified pixels to another print operation mask such as, for example, further print operation, as can be appreciated by the 2's allocated to the central region 308 of the area 304. In the example shown, any pixel assigned initially to the selected print operation on the basis of having the predetermined colour such as, for example, RGB(0,0,0) that is surrounded by adjacent pixels of the same colour will be assigned to a different print operation such as, for example, the further print operation 124. Therefore, it can be appreciated that the centrally disposed pixels, or interior pixels, shown in sub-figure (3) that are assigned to print mask "3" have been reassigned to print mask "2" as shown in sub-FIG. 2).

Figure 4:
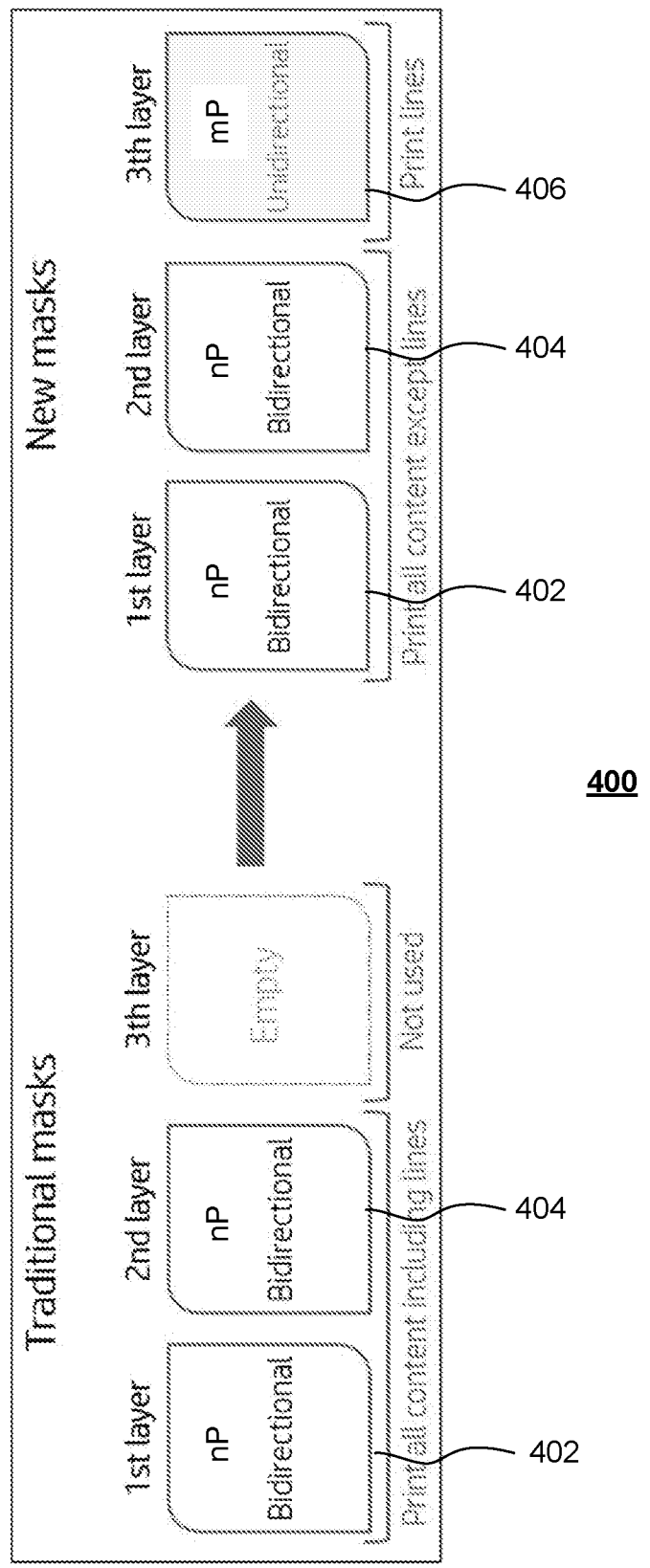
FIG. 4 shows several masks according to some examples.

Referring to FIG. 4, there is shown a view 400 of a plurality of print masks for influencing printing operations during printing. A number of existing masks are depicted. In the example shown, two such masks 402, 404 are illustrated; although a single traditional mask could be used. A traditional mask is arranged to support a predetermined type of printing. In the example illustrated, a traditional mask corresponds to a mask used for the above described further print operation 124. The traditional mask or masks 402, 404 support predetermined directional printing using a predetermined number of print operations per set of print traversals. The specific example illustrated supports bidirectional printing. The bidirectional printing can be effected over the set of print traversals. Examples can be realised in which the set of print traversals comprises 8 print traversals.

FIG. 4 also shows a selected feature mask 406. The selected feature mask 406 has a respective predetermined directional printing. The respective predetermined directional printing is unidirectional. The selected feature mask 406 has a prescribed number of print traversals during which zero, one or more than one print operation can be performed. In the example shown, the number of print operations per set of print traversals is 4 but could be some other number. For example, the number of print operations per set of print traversals for the selected feature mask 406 can be a fraction of the number of print operations per set of print traversals of the traditional mask.

It will be appreciated that the traditional mask 402, 404 is an example of a mask associated with the further print operation 124. The selected feature mask 406 is an example of a mask associated with the above described selected feature print operation 122.

The selected feature mask 406 is used to influence printing of pixels associated with selected features such as at least one or more than one of a line, an edge or predetermined values of the colour space of the image 126 taken jointly and severally in any and all permutations.

Although the traditional masks 402, 404 have been indicated in FIG. 4 as using a set of print traversals comprising 8 print traversals, examples can be realised in which the set of print traversals comprises some other number, n, of print traversals. Additionally, or alternatively, although the selected feature mask 406 has been indicated as using a set of print traversals comprising 4 print traversals, examples can be realised in which some other number, m, of print traversals. Examples can be realised in which a predetermined relationship exits between n and m. Example implementations can be realised in which m is proportional to n. Example implementations can be realised in which m is a fraction of n such as, for example, m=n/2. In FIG. 4, "nP" is indicative of a set of traversals comprising n print traversals and "mP" is indicative of a set of traversals comprising m print traversals. Examples can be realised in which n=8 and n=4. Examples can be realised in which n=6 and m=3.

At least one, or both, of the print mask 402, 404 in combination with the selected feature mask 406 can constitute a combined mask. The combined mask can comprise one or more than one section. An example implementation can be realised in which one section of the combined mask is associated with printing selected features of the image. Additionally, or alternatively, an example implementation can be realised in which the combined mask comprises at least one section associated with printing features of the image 126 other than the selected features.

Figure 5:
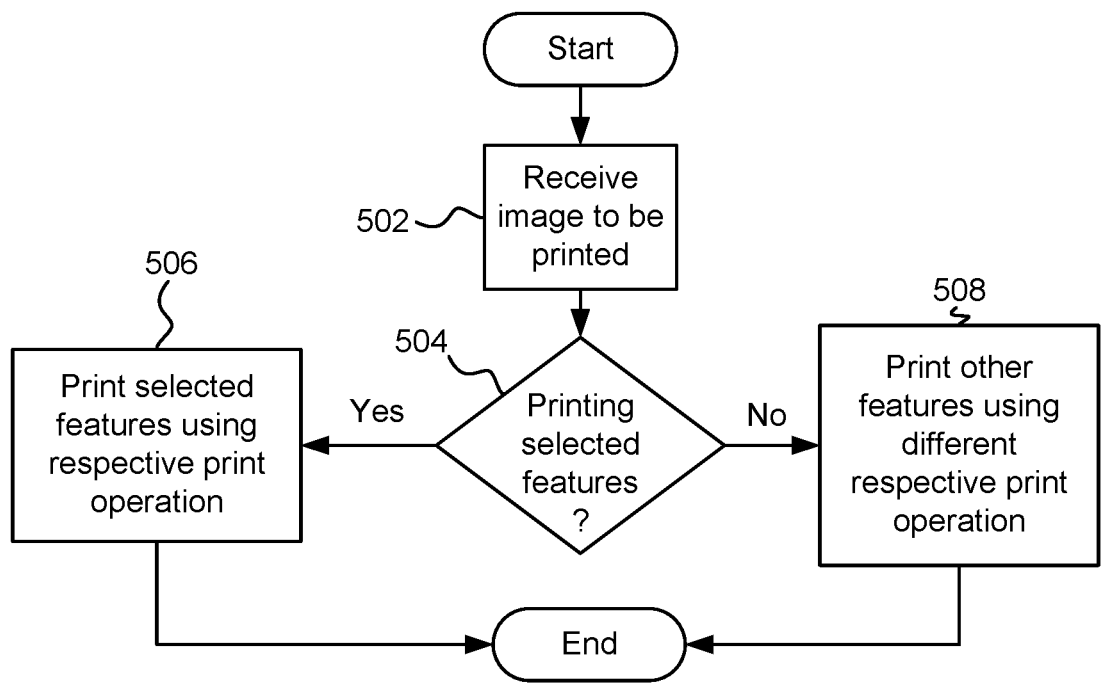
FIG. 5 illustrates a flowchart according to some examples.

Referring to FIG. 5, there is shown a view 500 of a flowchart according to an example implementation. At 502, an image 126 to be printed is received or otherwise accessed by, for example, the above controller 118. A determination is made at 504 regarding whether or not the image comprises selected features. The image processor 201 can undertake the determination at 504. If it is determined that the image 126 contains one or more than one selected feature, any selected features are printed using a respective print operation at 506. Example implementations can be realised in which the respective print operation is the above described selected feature print operation 122. If it is determined that the image 126 contains features other than, or in addition to, any selected feature or selected features, those features other than, or in addition to, any selected feature or selected features are printed using a respective print operation at 508. Example implementations can be realised in which the respective print operation for those features other than, or in addition to, any selected feature or selected features is the above described further print operation 124.

Figure 6:
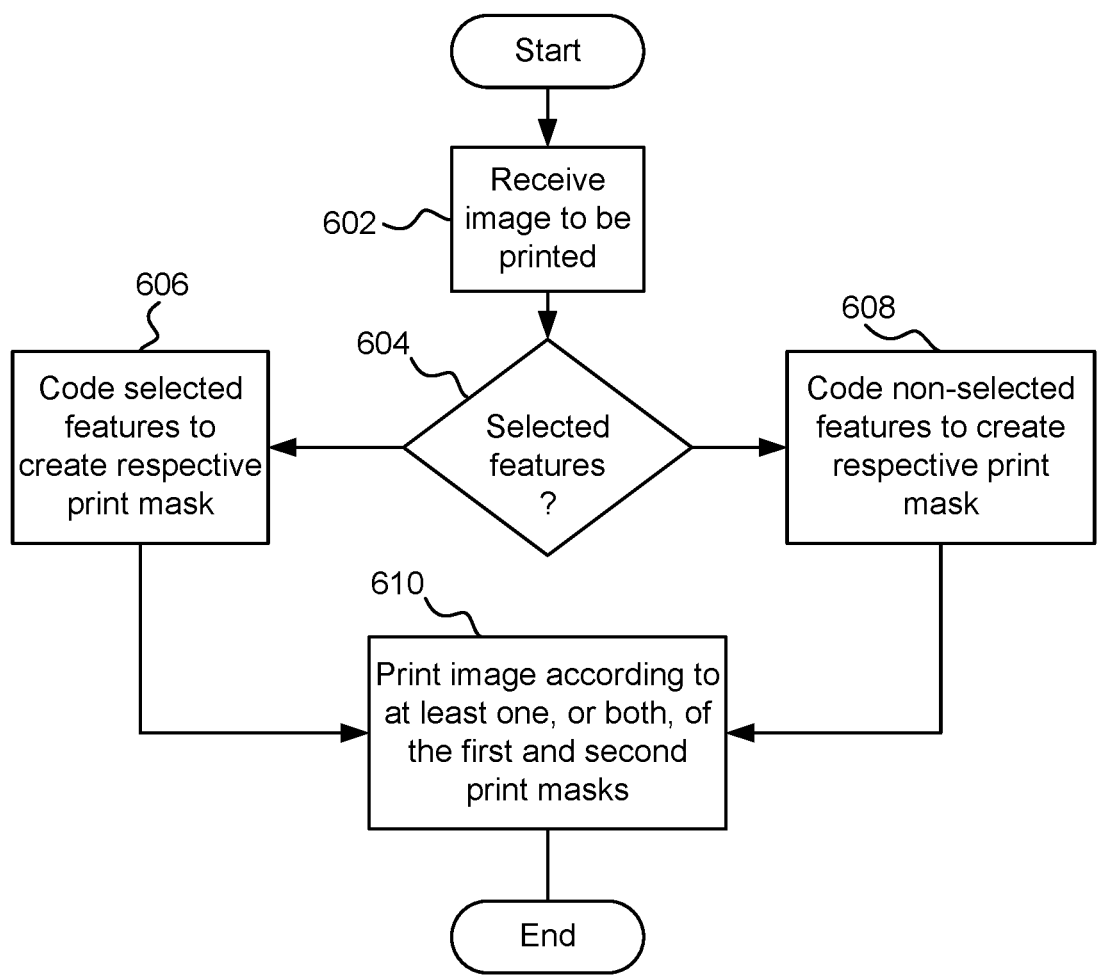
FIG. 6 depicts a flowchart according to some examples.

Referring to FIG. 6, there is shown a view 600 of a flowchart according to an example implementation. At 602, an image 126 to be printed is received or otherwise accessed by, for example, the above controller 118. A determination is made at 604 regarding whether or not the image 126 comprises a selected feature or selected features. The image processor 201 can make the determination at 604. If it is determined that the image 126 contains selected features, coding associated with any selected features is performed at 606 to create a respective print mask so that any selected features are printed using a respective print operation. Example implementations can be realised in which the respective print mask is the above described selected features print mask 406. Example implementations can be realised in which coding any selected features comprises providing an indication of a respective print mask to be used to print any selected features. Example implementations can be realised that use the above described selected features print mask 406. The selected features can comprise, or can be, at least one or more than one of a line, an edge, or pixel value taken jointly and severally in any and all permutations.

If it is determined that the image contains further features other than, or in addition to, any selected feature or selected features, further coding associated with any such further features is performed at 608 to create a respective print mask so that those further features are printed using a respective further print operation. Example implementations can be realised in which the respective further print mask for those further features is the above described further print mask 402, 404.

Having coded the image 126 so that appropriate parts of the image are printed using appropriate print masks, the image 126 can be printed at 610 according to the coding.

Example implementations can be realised as follows:

Example 1: A method of controlling printing of an image; the method comprising accessing at least one print mask comprising print operation control data for influencing printing of the image; printing selected features of the image according to one aspect of the print operation control data, and printing features of the image other than the selected features using a different aspect of the print operation control data.

Example 2: The method of example 1, in which the print operation control data comprises data determining a direction of printing for elements of the image.

Example 3: The method of examples 1 to 2, in which the print operation control data comprises data prescribing a single common direction for printing selected features of the image.

Example 4: The method of any of examples 1 to 3, in which the print operation control data comprises data prescribing bidirectional printing of features of the image other than the selected features.

Example 5: The method of any of examples 1 to 4, comprising identifying said selected features within the image.

Example 6: The method of any of examples 1 to 5, in which said selected features comprise at least one of a line, an edge or a predetermined colour of a colour space taken jointly or severally in any and all permutations.

Example implementations can be realised in the form of machine executable instructions arranged, when executed by a machine, to implement any or all aspects, processes, activities or flowcharts, taken jointly and severally in any and all permutations, described in this application. Therefore, implementations also provide machine-readable storage storing such machine executable instructions. The machine-readable storage can comprise non-transitory machine readable storage. The machine can comprise one or more processors or other circuitry for executing the instructions. For example, the controller 124 can process any such machine executable instructions.

Figure 7:
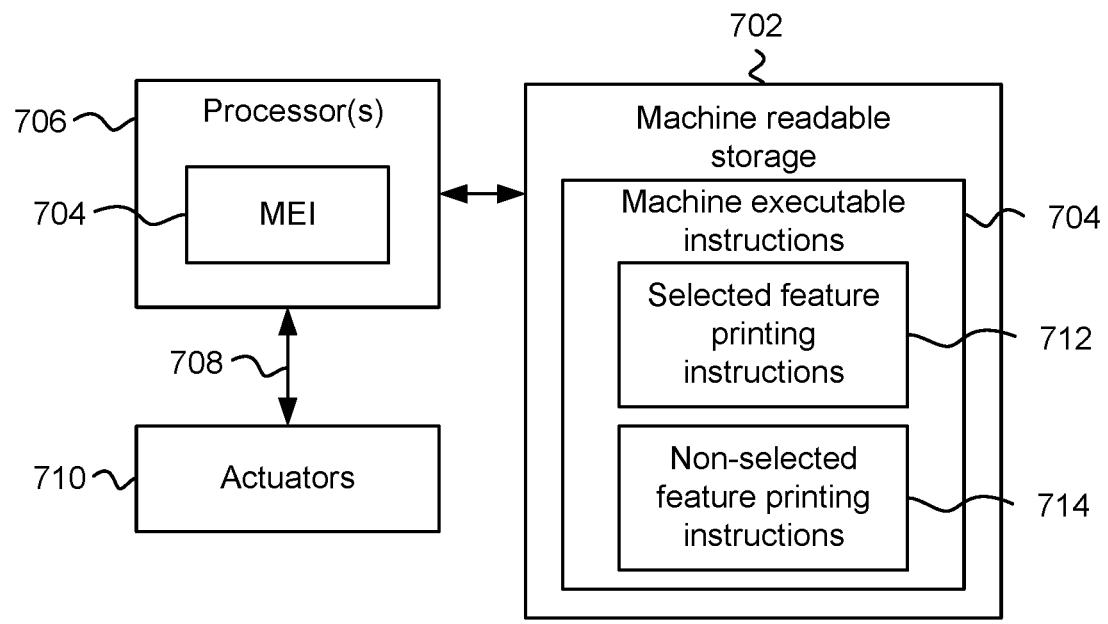
FIG. 7 shows machine-readable storage and machine executable instructions according to some examples.

Referring to FIG. 7, there is shown a view 700 of implementations of at least one of machine executable instructions or machine-readable storage. FIG. 7 shows machine-readable storage 702. The machine-readable storage 702 can be realised using any type of volatile or non-volatile storage such as, for example, memory, a ROM, RAM, EEPROM, optical storage and the like. The machine-readable storage 702 can be transitory or non-transitory. The machine-readable storage 702 stores machine executable instructions (MEIs) 704. The MEIs 704 comprise instructions that are executable by a processor or other instruction execution circuitry 706. The processor or other circuitry 706 is responsive to executing the MEIs 704 to perform any and all activities, operations, methods described and claimed in this application.

The processor or other circuitry 706 can output control signals 708 for influencing the operation of one or more than one actuator 710 for performing any and all operations, activities or methods described and claimed in this application.

The controller 124 can be an implementation of the foregoing processor or other circuitry 706 for executing any such MEIs 704.

The MEIs 704 can comprise, for example, at least one, or both, of instructions for printing selected features as described and/or as claimed in this application, as can be appreciated from instructions 712, or printing non-selected features as described and/or as claimed in this application, as can be appreciated from instructions 714.

Suitably, executing such MEIs 704 provides the following example implementations:

Example 7: A method to control printing of a printer, the method comprising:
accessing an image to be printed;
identifying at least one selected feature within the image; and
controlling printing of said at least one selected feature using a respective print operation, and controlling printing of said image, other said at least one selected feature, using a further respective print operation; said respective print operation being different to said further respective print operation.

Example 8: The method of example 7, in which the respective print operation has a respective number of printing operations; and said further respective print operation has a respective further number of printing operations; wherein said respective number of printing operations is less than said further respective number of printing operations.

Example 9: The method of example 8, comprising controlling the respective number of printing operations using a respective print mask.

Example 10: The method of either of examples 8 and 9, comprising controlling the respective further printing operations using a respective further print mask.

Example 11: The method of any preceding example, comprising printing elements corresponding to said at least one selected feature using a predetermined print operation.

Example 12: The method of example 11, in which the predetermined print operation comprises a predetermined numbered print operation.

Example 13: The method of example 12, in which the predetermined numbered print operation is an even numbered print operation.

Example 14: The method of any preceding example, comprising printing elements other than said at least one selected feature using a further predetermined print operation.

Example 15: The method of example 14, in which the further predetermined print operation comprises a predetermined numbered print operation.

Example 16: The method of example 15, in which the further predetermined numbered print operation comprises at least one, or both, of odd or even print operations.

Example 17: The method of any preceding example, comprising controlling printing of a contiguous region of the image using both the respective print operation for at least one selected feature of the contiguous region and said further respective print operation for said contiguous region other than said at least one selected feature.

Example 18: The method of any of preceding example, in which said at least one selected feature comprises at least one or more than one of a line, an edge or a predetermined colour of a respective colour space, taken jointly and severally.

Example 19: Machine-executable instructions comprising instructions arranged, when executed, implement a method of any preceding example. Such machine-executable instructions are an example of the above described MEIs 704.

Example 20: Machine executable instructions arranged, when executed by at least one processor, to control printing of a printer, the instructions comprising: instructions to identify selected features of a plurality of features of an image to be printed; the selected features to be printed using a reduced number of print operations relative to non-selected features of the plurality of features; the non-selected features to be printed using a greater number of print operations; instructions to control printing of the selected features of the image using the reduced number of print operations, and instructions to control printing of the non-selected features of the image using the greater number of print operations.

Example 21: Machine-readable storage storing machine-executable instructions of example 19 or example 20. Such machine-readable storage is an example of the above described machine-readable storage 702.

Any and all example implementations can be realised with or within a printer such as the printer described with reference to FIG. 1. The printer can be a multipass printer that is capable of printing at least one, or both, of bidirectionally or unidirectionally.

It will be appreciated that example implementations can reduce the time between uses or firing of a particular nozzle od a printhead. The more print traversals that are undertaken to print, the greater the time between uses of a nozzle and the greater the risk of a decap anomaly arising.

Any and all example implementations can optionally provide for spitting or otherwise ejecting or expelling printing fluid in between forward and reverse direction print traversals. Therefore, for said selected features, printing fluid can be ejected or expelled in advance of printing in a selected direction of traversal. The selected direction of traversal can be either a forward direction of traversal or a reverse direction of traversal. Any or all of the example implementations can be arranged in which an ejection of printing fluid precedes a forward direction traversal. Any such ejection preceding a forward direction traversal can be effected using the spittoon 116. Any and all example implementations could expel or eject printing fluid at least one, or both, of before or after any traversal in any direction.

A set of traversals for printing can comprise a predetermined sequence of print operations. For example, a set of traversals for printing can comprise an indication of which traversals cause respective printing nozzles to be fired. A nozzle of a printhead may have a predetermined associated sequence of numbers that indicate on which printing traversal that nozzle is or should be fired. The sequence of numbers can comprise numbers x to y. Example implementations can be realised in which numbers x to y are numbers 0 to 8 but could be some other set of numbers. An entry of 1 means print or fire a respective nozzle on the $1^{st}$ traversal. An entry of 0 corresponds to not firing the respective nozzle. An entry of 2 corresponds to printing on the $2^{nd}$ traversal and so on. Odd numbered entries correspond to nozzle firing on forward traversals. Even numbered entries correspond to nozzle firing on reverse traversals.

An any or all examples or example implementations, a selected feature print operation can comprise, or relate to, at least one or more than one of the following, taken jointly and severally in any and all permutations:

printing a selected feature using a predetermined, or reduced, number of print traversals, printing a selected feature using a predetermined, or reduced, number of print traversals relative to a predetermined set of print traversals, printing a selected feature using a predetermined direction of print traversal; the predetermined direction of print traversal can be a forward, or reverse, print traversal, printing a selected feature using one or more than one of a predetermined numbered print traversal; the predetermined numbered print traversal can be an odd, or an even, numbered print traversal, or printing a selected feature using a fraction, or reduced number of print traversals, relative to a predetermined number of print traversals associated with a set of print traversals.

The foregoing can be performed without or without a nozzle cleaning, or unblocking, operation such as ejecting or expelling printing fluid in advance of, or after, a print traversal. A print traversal, or other traversal, comprises a movement of the print carriage that allows printing on a medium such as the medium 106.

In any or all examples or example implementations, a further respective print operation can comprise printing as indicated above but in relation to a feature other said at least one selected feature. Therefore, in any and all examples or example implementations a further print operation can comprise, or relate to, at least one or more than one of the following, taken jointly and severally in any and all permutations:

printing a feature other than a selected feature using a predetermined, or reduced, number of print traversals, printing a feature other than a selected feature using a predetermined, or reduced, number of print traversals relative to a predetermined set of print traversals, printing a feature other than a selected feature using a predetermined direction of print traversal; the predetermined direction of print traversal can be a forward, or reverse, print traversal, or printing a feature other than a selected feature using one or more than one of a predetermined numbered print traversal; the predetermined numbered print traversal can be an odd, or an even, numbered print traversal.

It will be appreciated that "printing" can comprise firing print nozzles, or otherwise ejecting or expelling printing fluid, to print a feature such as, for example, a selected feature or any other feature. Furthermore, printing may or may not occur on every printing traversal. A printing traversal can be selectively engaged to print as directed.

An any or all examples or example implementations, a selected feature print operation can comprise, or relate to, at least one or more than one of the following, taken jointly and severally in any and all permutations:

printing a selected feature using a predetermined, or reduced, number of print traversals, printing a selected feature using a predetermined, or reduced, number of print traversals relative to a predetermined set of print traversals, printing a selected feature using a predetermined direction of print traversal; the predetermined direction of print traversal can be a forward, or reverse, print traversal, printing a selected feature using one or more than one of a predetermined numbered print traversal; the predetermined numbered print traversal can be an odd, or an even, numbered print traversal, or printing a selected feature using a fraction, or reduced number of print traversals, relative to a predetermined number of print traversals associated with a set of print traversals.

The foregoing can be performed without or without a nozzle cleaning, or unblocking, operation such as ejecting or expelling printing fluid in advance of, or after, a print traversal. A print traversal, or other traversal, comprises a movement, or operation, of the print carriage, or medium, that allows printing on a medium such as the medium 106.

In any or all examples or example implementations, a further respective print operation can comprise printing as indicated above but in relation to a feature other said at least one selected feature. Therefore, in any and all examples or example implementations a further print operation can comprise, or relate to, at least one or more than one of the following, taken jointly and severally in any and all permutations:

printing a feature other than a selected feature using a predetermined, or reduced, number of print traversals, printing a feature other than a selected feature using a predetermined, or reduced, number of print traversals relative to a predetermined set of print traversals, printing a feature other than a selected feature using a predetermined direction of print traversal; the predetermined direction of print traversal can be a forward, or reverse, print traversal, or printing a feature other than a selected feature using one or more than one of a predetermined numbered print traversal; the predetermined numbered print traversal can be an odd, or an even, numbered print traversal.

It will be appreciated that "printing" can comprise firing print nozzles, or otherwise ejecting or expelling printing fluid, to print a feature such as, for example, a selected feature or any other feature. Furthermore, printing may or may not occur on every printing traversal. A printing traversal can be selectively engaged to print as directed.

Throughout the description and claims of this application, the words "comprise" and "contain" and variations of them mean "including but not limited to", and they are not intended to (and do not) exclude other moieties, additives, components, integers or steps. Throughout the description and claims of this application, the singular encompasses the plural unless the context otherwise requires. Where the indefinite article is used, the specification is to be understood as contemplating the plural as well as the singular, unless the context requires otherwise.

Although the above implementations have been described within a TIJ printing context, example implementations are not limited to such a technology. Any and all example implementations can be used for controlling printheads realised using technology other than TIJ technology such as, for example, piezoelectric print heads.

It will be appreciated the example implementations can be realised using page-wide printheads. Some printers have one or more than one print head that spans the medium to be printed. Such printers are known as page-wide arrays. Page-wide array printers can have static print heads, that is, the carriage bearing the print heads does not traverse the medium rather the medium moves relative to the one or more than one print head.

The invention claimed is:

1. A controller for controlling printing of a printer, the controller comprising:
   an input interface for accessing an image to be printed;
   an image processor to identify at least one selected feature within the image; and print control circuitry:
   a. to control printing of said at least one selected feature using a respective print operation; and
   b. to control printing of said image, other said at least one selected feature, using a further respective print operation;
   c. said respective print operation being different to said further respective print operation, and wherein the further respective print operation is associated with a further set of print traversals and the respective print operation is associated with a set of print traversals, wherein the further set of print traversals and the set of print traversals are different, and wherein a fractional relationship exists between the further set of print traversals and the set of print traversals.

2. The controller of claim 1, in which
   a. the respective print operation has a respective number of printing operations; and
   b. said further respective print operation has a respective further number of printing operations;
   c. wherein said respective number of printing operations is less than said further respective number of printing operations.

3. The controller of claim 2, in which the respective number of printing operations is associated with a respective print mask for controlling the respective number of printing operations.

4. The controller claim 3, in which the respective further number of printing operations is associated with a respective further print mask to control the respective further printing operations.

5. The controller of claim 4, in which the respective print operation is arranged to print elements corresponding to said at least one selected feature using a predetermined print operation.

6. The controller of claim 5, in which the predetermined print operation comprises a predetermined numbered print operation.

7. The controller of claim 6, in which the predetermined numbered print operation is an even print operation, and wherein the fractional relationship is the set of print traversals being half of the further set of print traversals.

8. The controller of claim 7, in which the respective further print operation is arranged to print elements other than said at least one selected feature using a further predetermined print operation.

9. The controller of claim 8, in which the further predetermined print operation comprises a predetermined numbered print operation.

10. The controller of claim 9, in which the further predetermined numbered print operation comprises at least one, or both, of odd or even print operations.

11. The controller of claim 1, in which the print control circuitry comprises circuitry to control printing of a contiguous region of the image using both the respective print operation for at least one selected feature of the contiguous region and said further respective print operation for said contiguous region other than said at least one selected feature.

12. The controller of claim 1, in which said at least one selected feature comprises at least one or more than one of a line, an edge or a predetermined colour of a respective colour space.

13. A printer comprising a controller as claimed in claim 1.

14. A method, comprising:
   identifying selected features of a plurality of features of an image to be printed; the selected features to be printed using a reduced number of print operations relative to non-selected features of the plurality of features; the non-selected features to be printed using a greater number of print operations;
   controlling printing of the selected features of the image using the reduced number of print operations, and
   controlling printing of the non-selected features of the image using the greater number of print operations, and wherein the greater number of print operations are associated with a further set of print traversals and the reduced number of print operations are associated with a set of print traversals, wherein the further set of print traversals and the set of print traversals are different, and wherein a fractional relationship exists between the further set of print traversals and the set of print traversals.

15. Non-transitory machine-readable storage storing machine-executable instructions, the instructions comprising:

instructions to identify selected features of a plurality of features of an image to be printed; the selected features to be printed using a reduced number of print operations relative to non-selected features of the plurality of features; the non-selected features to be printed using a greater number of print operations;

instructions to control printing of the selected features of the image using the reduced number of print operations, and instructions to control printing of the non-selected features of the image using the greater number of print operations, and wherein the greater number of print operations are associated with a further set of print traversals and the reduced number of print operations are associated with a set of print traversals, wherein the further set of print traversals and the set of print traversals are different, and wherein a fractional relationship exists between the further set of print traversals and the set of print traversals.

* * * * *